United States Patent [19]

Claussen

[11] Patent Number: 5,340,504
[45] Date of Patent: Aug. 23, 1994

[54] LIGHT-POLARIZING FILMS CONTAINING DICHROIC DYES

[75] Inventor: Uwe Claussen, Leverkusen, Fed. Rep. of Germany

[73] Assignee: Bayer AG, Leverkusen, Fed. Rep. of Germany

[21] Appl. No.: 21,728

[22] Filed: Feb. 23, 1993

Related U.S. Application Data

[63] Continuation of Ser. No. 825,125, Jan. 24, 1992, abandoned.

[30] Foreign Application Priority Data

Feb. 5, 1991 [DE] Fed. Rep. of Germany ....... 4103346

[51] Int. Cl.⁵ .................. G02B 1/04; C08K 5/23; C09B 31/22; C09B 33/26; C09B 35/56; C09B 56/04
[52] U.S. Cl. .................. 252/585; 252/501.1; 534/689; 534/806; 534/815
[58] Field of Search ............ 534/806, 815, 689; 252/585, 501.1

[56] References Cited

U.S. PATENT DOCUMENTS

| | | | |
|---|---|---|---|
| 1,416,621 | 5/1922 | Dedichen | 534/815 |
| 1,498,316 | 6/1924 | Bauer et al. | 534/815 |
| 1,819,961 | 8/1931 | Mayer et al. | 534/815 |
| 1,829,673 | 10/1931 | Richard | 534/806 |
| 1,906,754 | 5/1933 | Jordan | 534/815 |
| 4,006,130 | 2/1977 | Ditzer | 534/689 |

FOREIGN PATENT DOCUMENTS

| | | | |
|---|---|---|---|
| 0376032 | 7/1990 | European Pat. Off. | 534/806 |
| 2901654 | 7/1980 | Fed. Rep. of Germany | 534/689 |
| 6356571 | 3/1985 | Japan | 534/689 |
| 61-53362 | 3/1986 | Japan | 534/689 |
| 1-167603 | 7/1989 | Japan | 534/806 |

OTHER PUBLICATIONS

Orbit abstract of EP 376 032.

*Primary Examiner*—Floyd D. Higel
*Attorney, Agent, or Firm*—Connolly & Hutz

[57] ABSTRACT

The invention relates to light-polarizing films based on water-soluble organic polymers, more particularly polyvinyl alcohol (PVAL), which contain one or more dichroic bis-, tris- or tetrakis-azo dyes.

7 Claims, No Drawings

LIGHT-POLARIZING FILMS CONTAINING DICHROIC DYES

This application is a continuation of application Ser. No. 07/825,125, filed Jan. 24, 1992, now abandoned.

This invention relates to new dichroic tris-azo and tetrakis-azo dyes which are bluish red to blue-green in color and to light-polarizing films based on water-soluble, transparent organic polymers, more particularly polyvinyl alcohol (PVAL), which contain the new dichroic dyes.

Films based on polyvinyl alcohol (PVAL) containing iodine or dichroic dyes as polarizing agents are known.

Hitherto, only iodine-containing polarizers have been used on a large scale, for example in passive liquid-crystal displays for displaying information. In the absence of moisture, these films are characterized by excellent light stability and by excellent dichroic properties in the long-wave range of the visible spectrum. The active agent on these films is the iodine/PVAL complex (M. M. Zwick, J. Appl. Polym. Sci.; 9 2393-2424 (1965)) which absorbs in daylight over a broad band, but not completely. In the short-wave (green-yellow) region of the spectrum, there is an area of reduced extinction so that the films are blue in color.

This has unfavorable consequences if it is desired to obtain white light after transmission through the film. The light let through unpolarized reduces the dichroism and, hence, the degree of polarization in this region. To increase the dichroism, the concentration of iodine complex has to be increased. However, this correction in the short-wave region results in excessive extinction in the long-wave region. This in turn results in distinct weakening of the light let through in the transmitting position. An optical display incorporating this film is reduced in its lightness. To achieve reasonable lightness, compromises have to be made.

An important critical parameter of a universally useable optical display is its readability under various illumination conditions which is normally expressed as the perceived contrast ratio (PCR = transmission in the transmitting position (T∥) transmission in the blocking position (T⊥)). It follows from this that, on the one hand, transmission must be made as low as possible in the blocking position (T⊥) (readability in darkness) and, on the other hand, as high as possible in the transmitting position (T∥) (readability in light). This requires a totally uniform, high polarization performance of the filter over the entire region of the visible spectrum which, in principle, cannot be achieved with the iodine film.

The mode of operation of a light-polarizing film and the basic physical principles and also the corresponding structural requirements in the matrix are known, for example, from U.S. Pat. No. 4,440,451.

There has been no shortage of attempts to replace iodine by dye triples of dichroic dyes to produce a neutral grey with uniform dichroism. However, this requires a range of high-performance dyes. In addition to good light and weather fastness values, they must have high extinction and high dichroism in the matrix. Thus, polyazo dyes, for example based on 4-nitro-4'-aminoflavonic (JA 59-145 255, 60-156 759, 60-168 743) or on substituted benzidine (JA 61 255 304), have been proposed as preferred dyes. In addition, numerous direct dyes have been mentioned.

However, although dichroism is a widespread property in dyes (cf. W. Hanle, H. Scherer, Zeitschr. Naturforsch. 6a 437–439 (1951)), it has not hitherto been possible to match or surpass the dichroic and spectral properties of the iodine film. This is attributable in particular to the absence of good blue tones. Some blue dyes have been described as dichroic in the literature, including for example Direct Blue 1, 106, 107, 109, 190, 202. Dichroic azo dyes containing 4-hydroxy-7-aminonaphthalene-2-sulfonic acid (I acid) are known from JA 01 252 904, 01 248 105, 01 167 703, 61 255 304, WO 89 501. Although the compounds described therein are dichroic, neither the effect nor the absorption wavelength is sufficient to close the gaps present in the blue region.

It has now surprisingly been found that certain azo dyes show excellent dichroic properties, particularly in the red long-wave spectral region of visible light, and are eminently suitable for the production of light-polarizing films.

(Any definition of a substituent or index given in the following will apply throughout the specification).

The present invention relates to dichroic dyes which, in the form of the free acid, correspond to general formula I

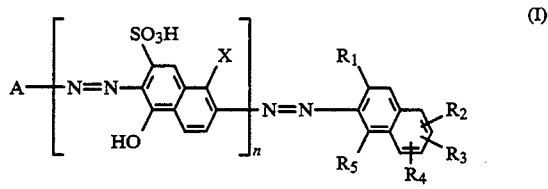

in which n is the number 1 or 2,

A is an optionally substituted aryl or heterocyclic radical, $R_1$ and $R_3$ independently of one another represent hydrogen or $SO_3H$, $R_2$ is hydrogen, $NH_2$, NH—acyl, N(H)—alkyl, NH—aryl, $R_4$ is hydrogen, OH, OR, $SO_3H$, Cl or the group —N=N—A' where R is an aliphatic radical containing up to 4 carbon atoms, A' is an optionally substituted aryl or heterocyclic radical, and $R_5$ is OH, $NH_2$ and X is Cl, $SO_3H$ or H.

Preferred radicals A are:

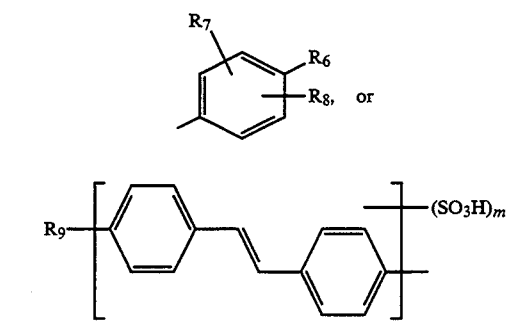

in which $R_6$ is $NO_2$, CN, $CF_3$ or has the meaning defined in formula I for the substituents $R_4$ or $R_2$, $R_7$ is COOH, COOR, CN, $NO_2$, halogen, OH, OR, R, $SO_3H$ or has the meaning defined in formula I for $R_2$, $R_8$ is H, R, OR, $R_9$ is $NO_2$, CN, COOR, the group $-N=N-A'$ or has the meaning defined in formula I for $R_2$, R is an aliphatic radical containing up to 4 carbon atoms and m is the number 1 or 2.

Preferred substituents A' are

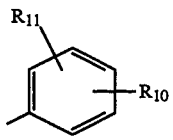

in which $R_{11}$ is H, $NO_2$, CN, OR, $SO_3H$, $CF_3$, halogen or has the meanings defined for the substituents $R_2$ or R, $R_{10}$ is H, COOH, COOR, CN, $NO_2$, halogen, OH, OR, $SO_3H$ or has the meanings defined for the substituents $R_2$ or R.

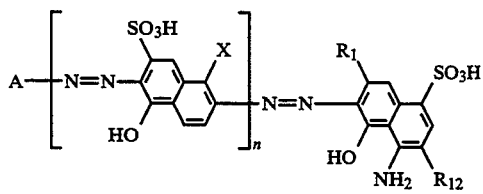

(II)

in which

X is Cl, $SO_3H$ or H, n is the number 1 or 2 and $R_{12}$ is H, $SO_3H$ or $-N=N-A_1$ if $R_1$ is H and is H or $-N=N-A_1$ if $R_1$ is $SO_3H$ where $A_1$ is the group

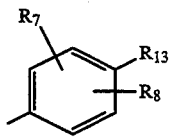

wherein $R_{13}$ is H, $NO_2$, CN, OR, $SO_3H$, Cl or the group $-N=N-A'$ or has the meaning defined for the substituent $R_2$ and A', $R_7$ and $R_8$ are as defined above. Other particularly preferred dyes correspond to general formula III

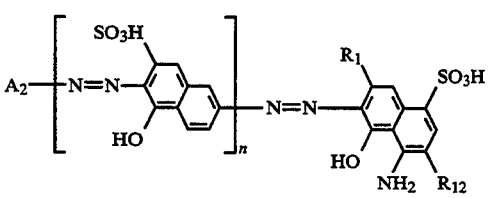

(III)

in which $A_2$ is the group

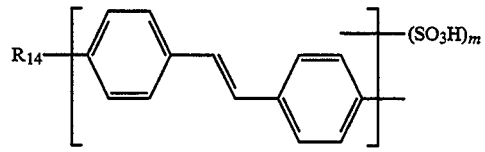

wherein $R_{14}$ is the group

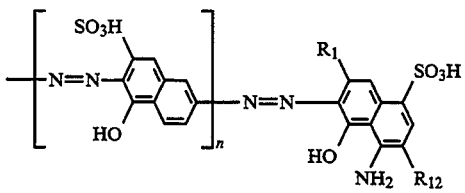

and $R_{12}$ is H, $SO_3H$ or $-N=N-A_1$ if $R_1$ is H and is H or $-N=N-A_1$ if $R_1$ is $SO_3H$ and $A_1$ is as defined above, m is the number 1 or 2 and n is the number 1 or 2.

The dyes are new. They may be obtained by the methods typically used in the chemistry of azo dyes, namely by diazotization and coupling.

The present invention also relates to light-polarizing films containing a water-soluble organic polymer and one or more compounds corresponding to formula I, preferably compounds corresponding to formula II or III, or mixtures with other dyes, including dichroic dyes.

The organic polymer is preferably an oriented polymer which forms transparent films and which is compatible with dyes containing acidic groups. Examples of such polymers are polyamides, cellulose acetate, vinyl alcohol homopolymers and copolymers, vinyl acetate homopolymers and copolymers, the copolymers containing, for example, ethylene, propylene, crotonic acid, (meth)acrylic acid and maleic acid as comonomers. Preferred polymers are polyvinyl alcohols which have been obtained by complete or partial saponification of polyvinyl acetate, more particularly types which, in the form of a 4% aqueous solution, have a viscosity of >4 mPas and, preferably, 20 to 70 mPas at 20° C. and a degree of saponification of >80 mol-% and preferably 90 to 100 mol-%.

The films have a layer thickness of 5 to 50 μm in their unstretched state and a thickness of 1 to 40 μm and preferably 5 to 15 μm in their stretched state.

The films preferably contain 0.01 to 10% by weight and, more preferably, 0.5 to 6% by weight dyes, based on the weight of the film.

The films are dyed in known manner, for example by dyeing the polymers dissolved in water. The film is formed from the solution in known manner by producing a 5 to 150 μm and preferably 15 to 50 μm thick film and stretching it by 200 to 1,000% at a temperature of 60° to 180° C. and preferably at a temperature of 80° to 160° C.

It is advisable to remove foreign salts from the dyes or the dye salts before they are used, for example by recrystallization, extraction and/or dialysis.

If desired, the dye-containing films may also be subjected to an aftertreatment, for example with aqueous boric acid solution, to improve their moisture resistance or their permeability to light. The conditions under which this aftertreatment is carried out may vary irrespective of the film material and the dye. The aftertreatment is preferably carried out with a 1 to 15% by weight and, more preferably, with a 5 to 10% by weight boric acid solution at 30° to 80° C. and, more preferably, at 50° to 80° C. Surfactants and, optionally, inorganic salts are preferably added to the boric acid solution. The surfactants may be nonionic, cationic or anionic and are preferably nonionic.

Examples of nonionic surfactants are adducts of ethylene oxide with higher alcohols or phenols, for example nonylphenol. The surfactant is preferably used in a quantity of 0,005 to 0.5% by weight and, more preferably, in a quantity of 0.02 to 0.2% by weight, based on water. The inorganic salts are, preferably, Na sulfate and also K sulfate, Na chloride, K chloride, Na nitrate. The inorganic salts are preferably used in a quantity of 0.1 to 5% by weight and, more preferably, in a quantity of 0.3 to 3% by weight, based on water. If desired, a fixing treatment may be carried out with an aqueous solution of a high molecular weight cationic compound.

The dichroism of the system may be considerably strengthened by additions to the casting solution of lower polyhydric alcohols, such as methanol, ethanol or glycol, glycerol, trimethylol ethane, trimethylol propane, pentaerythritol, sorbitol, ethers thereof, such as glycol monomethyl ether, glycol monoethyl ether, glycol dimethyl ether, lower hydroxyamines, such as propanolamine, or amides, such as DMF, N-methyl pyrrolidone, pyrrolidone, ε-caprolactam. The additives may be used individually or, with greater advantage, in the form of mixtures which may also contain lower monohydric alcohols, for example methanol, ethanol, i-propanol.

The additives are preferably added to the casting solution in quantities of 0.5 to 50% by weight, based on 100% by weight of the casting solution.

In addition, surface-active compounds may be used to control surface tension. Suitable surface-active compounds are, for example sulfonic acids, such as alkanesulfonic acids, more particularly sulfosuccinic acid octyl ester, perfluoroalkanesulfonic acids, more particularly perfluoro-octanesulfonic acid and its tetraalkyl ammonium salt, for example the tetraethylammonium salt, sulfates, more particularly sulfated alkylphenol polyglycol ethers or alkylsulfonates, amphoteric surfactants, more particularly alkanamidopropyl betaines, for example lauramidopropyl betaine, or the compounds named in CA under the following Reg. Nos.: 73772-45-9, 96565-37-6, 4292-10-8, 59272-84-3, 25729-05-9, 6179-44-8, 21244-99-5, 58793-79-6, 32954-43-1, 92836-76-5, or nonionic surfactants, such as 4-octylphenol polyglycol ether.

The light-polarizing films may be compounded or laminated with other birefrigence-free materials by methods known per se. Suitable protective coatings are, for example, films of a tetrafluoroethylene/hexafluoroethylene copolymer or any other fluorocarbon resin, a polyester, polyolefin or polyamide resin, a polycarbonate or cellulose ester, preferably cellulose (tri)acetate, propionate or butyrate.

The dyes according to the invention are used individually or in admixture as dichroic dyes in polarization filters while the films obtainable therefrom are used as polarization filters, for example for making ordered structures visible in the analysis of polymers and in biological material.

The forms mentioned are those of the corresponding free acids. The dyes are generally isolated in the form of alkali metal Salts, particularly the sodium salts.

The weights mentioned in the Examples are based on the free acid.

EXAMPLE 1

4-Nitro-o-sulfanilic acid is diazotized and coupled neutrally to I acid. 43 mmol of this dye are dissolved in 200 ml water and indirectly diazotized. After stirring for 1 hour, the excess nitrous acid is removed with amidosulfonic acid and a solution of 43 mmol 4-hydroxy- 7-aminonaphthalene-2,8-disulfonic acid in 200 ml water is added. Coupling is completed overnight at pH 8-9, the dye is filtered under suction and the sulfo groups are split off by boiling for 12 h in a 1:1 mixture of water and N-methyl pyrrolidone containing 60 ml concentrated hydrochloric acid. This dye is diazotized and added dropwise to a solution in 100 ml water of 7.2 mmol of a dye obtained by acidic coupling of p-sulfanilic acid onto 4-amino-5-hydroxynaphthalene sulfonic acid. After stirring overnight, the dye is precipitated by addition of acetone, optionally dissolved and allowed to crystallize once more and then washed with aqueous acetone. 0.1 g dye are dissolved in 9.9 g Mowiol ® 28–99 (a product of Hoechst AG) and 190 ml water and a 500μ thick layer is cast from this solution. After evaporation of the water, an approx. 50μ thick dark-blue film is obtained. The film is stretched by 500% at 130° C. The dichroic ratio (CR) is 15.3 at 650 nm.

EXAMPLE 2

2-Amino-5-nitro-benzenesulfonic acid is diazotized and coupled neutrally to I acid. 43 mmol of this dye are dissolved in 200 ml water and indirectly diazotized. After stirring for 1 hour, the excess nitrous acid is removed with amidosulfonic acid and a solution of 43 mmol 4-hy-droxy-7-aminonaphthalene-2,8-disulfonic acid in 200 ml water is added. Coupling is completed overnight at pH 8-9, the dye is filtered under suction and the sulfo group is split off by boiling for 12 h in a 1:1 mixture of water and N-methyl pyrrolidone containing 60 ml concentrated hydrochloric acid. This dye is diazdtized and added dropwise to a solution in 100 ml water of 7.2 mmol of a dye obtained by acidic coupling of p-sulfanilic acid onto 4-amino-5-hydroxynaphthalene-1,3-disulfonic acid. After stirring overnight, the dye is precipitated by addition of acetone, optionally dissolved and allowed to crystallize once more and then washed with aqueous acetone. 0.1 g dye are dissolved in 9.9 g polyvinyl alcohol (PVAL) (Mowiol ®28–99, a product of Hoechst AG) and 190 ml water and a 500μ thick layer is cast from this solution. After evaporation of the water, an approx. 50μ thick dark-blue film is obtained. The film is stretched by 500% at 130° C. The value is 15.3 at 650 nm. If the following acids are used instead of 4-amino-5-hydroxynaphthalene-,1, 3-disulfonic acid, the following results are obtained:

| | CR | λ |
|---|---|---|
| 4-hydroxy-5-aminonaphthalene-2,8-disulfonic acid | 26.8 | 600 |
| 4-hydroxy-5-aminonaphthalene-2,7-disulfonic acid | 24.9 | 590 |
| 4-hydroxy-7-aminonaphthalene-1,5-disulfonic acid | 24.8 | 570 |
| 4-hydroxy-5-ethoxynaphthalene2,7-disulfonic | 221. | 570 |

| | CR | λ |
|---|---|---|
| acid | | |
| 4-hydroxy-6-aminonaphthalene-2-sulfonic acid | 19.0 | 630 |

CR Dichroic ratio
λ Wavelength in nm

EXAMPLE 3 p-Sulfanilic acid is diazotized and coupled neutrally to I acid. The further procedure is then as in Example 1, except that, in the final step, the dye is coupled onto 4-amino-5-hydroxynaphthalene-1,3-disulfonic acid, resulting in the formation of a blue dye corresponding to the following formula:

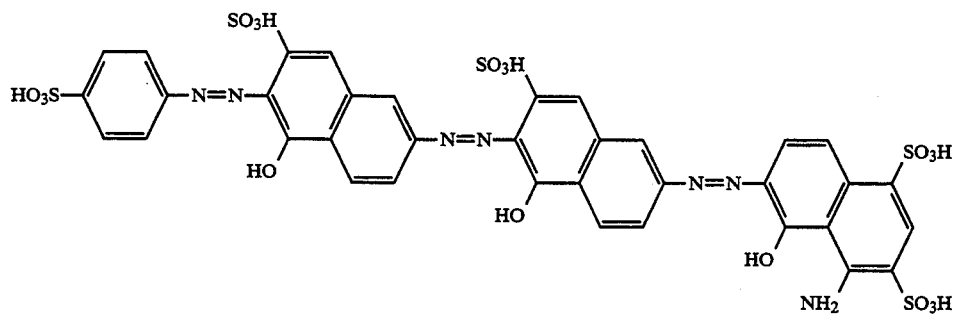

A film is produced from this dye as described in Example 1, the dichroic ratio being 35.6 at 600 nm. If 4-amino-5-hydroxynaphthalene-2,8-disulfonic acid is used instead of 4-amino-5-hydroxynaphthalene-1,3-disulfonic acid, a blue dye having a dichroic ratio of 36.1 at 600 nm is obtained. If 4-aminoazobenzene-4'-sulfonic acid is used instead of the sulfanilic acid, the dye formed has a dichroic ratio of 39.2 at 620 nm after incorporation in PVAL as described in Example 1.

EXAMPLE 4

4,4'-Diaminostilbene-2-sulfonic acid is diazotized and coupled as described in Example 1 onto 4-hydroxy-7-acetylaminonaphthalene-2-sulfonic acid and the dye formed is saponified. It is then tetra-azotized and coupled at pH 6.5 onto 4-amino-5-hydroxynaphthalene-1,3-disulfonic acid. The dye formed-corresponds to the formula

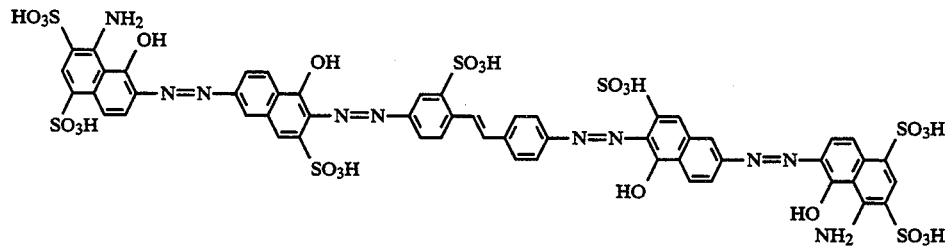

and has a dichroic ratio of 48.1 at 640 nm. If 4-hydroxy-7-benzoylaminonaphthalene-2-sulfonic acid is used instead of 4-amino-5-hydroxynaphthalene-1,3-sulfonic acid, a blue dye is obtained and, after incorporation in PVAL under the conditions described in Example 1, has a dichroic ratio of 39.7 at 620 nm. If 4-hydroxy-5-aminonaphthalene-2,8-disulfonic acid is used instead of 4-amino-5-hydroxynaphthalene-1,3-sulfonic acid, a blue dye is obtained and, after incorporation in PVAL under the conditions described in Example 1, has a dichroic ratio of 45.3 at 640 nm.

EXAMPLE 5

4-Nitro-4'-aminostilbene-2-sulfonic acid is diazotized and coupled as in Example 1 onto 4-hydroxy-7-acetylamino-naphthalene-2-sulfonic acid and the dye formed is saponified. It is then re-diazotized and coupled onto 4-amino-5-hydroxynaphthalene-1,3-disulfonic acid. A blue dye is isolated and, after incorporation in PVAL as described in Example 1, has a CR value of 33.2 at 620 nm.

EXAMPLE 6

43 mmol 2-aminobenzthiazole-7-sulfonic acid are dissolved in 120 ml 85% phosphoric acid/glacial acetic acid (2:1). 15 g nitrosyl sulfuric acid are added dropwise, followed by stirring for 1 hour. The excess diazotizing agent is removed with urea. A solution of 50 ml glacial acetic acid and 5.95 g 2-methoxy-6-methyl aniline is then added dropwise and, after 1 h, the mixture is poured out onto 200 ml water. The dye is precipitated with NaCl solution, the paste is filtered under suction and dried. 14.5 mmol of this dye-are diazotized as just described. The diazonium salt solution is then added to a solution of 100 ml water, 14.5 mmol 2-amino-5-hydroxynaphthalene-1,7-disulfonic acid and 15% soda, the pH value being kept at 8 to 8.5 by the addition of more soda solution. After filtration under suction, the paste is boiled for 2.5 h in 300 ml water containing 60 ml conc. HCl. The poorly soluble dye is filtered off under suction after cooling. 7.2 mmol of this dye are diazotized as described in phosphoric acid/glacial acetic acid. The diazotization solution is added dropwise to a solution of 7.2 mmol 4-amino-5-hydroxynaphthalene-1,3-disulfonic acid, the pH value having to be kept at 8 to 8.5. After filtration under suction and washing, the blue dye is dried and incorporated in PVAL as described in Example 1. A violet accompanying component is discernible in a thin-layer chromatogram. The dye has a CR value of 14.4 at 650 nm.

I claim:

1. Light-polarizing film containing at least one organic water-soluble polymer and one or more dichroic dyes which, in the form of the free acid, correspond to the following formula I

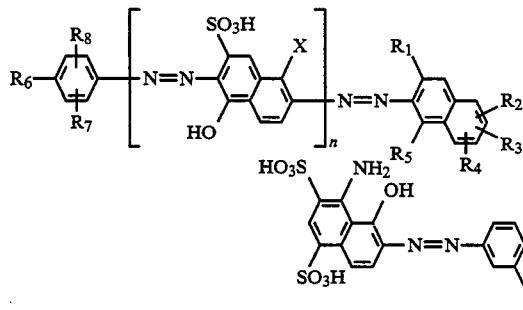

in which
n is the number 1 or 2
R is $C_{1-14}$ alkyl
$R_1$ and $R_3$ independently of one another represent H or $SO_3H$,
$R_2$ is selected from the group consisting of H, $NH_2$, NH-acetyl, NH-benzoyl, NH-alkyl and NH-aryl,
$R_4$ is selected from the group consisting of H, OH, OR, $SO_3H$ and Cl,
$R_5$ i OH or $NH_2$,
$R_6$ is selected from the group consisting of $NO_2$, CN, $CF_3$, H, $NH_2$, NH-acetyl, NH-benzoyl, NH-alkyl, NH-aryl, OH, OR, $SO_3H$ and Cl,
$R_7$ is selected from the group consisting of COOH, COOR, CN, $NO_2$, halogen, OH, OR, R, $SO_3H$, H, $NH_2$, NH-acetyl, NH-benzoyl, NH-alkyl and NH-aryl,
$R_8$ is H, R or OR and
X is Cl, $SO_3H$ or H.

2. Light-polarizing film containing at least one organic water-soluble polymer and a dichroic dye which, in the form of the free acid, corresponds to the following formula

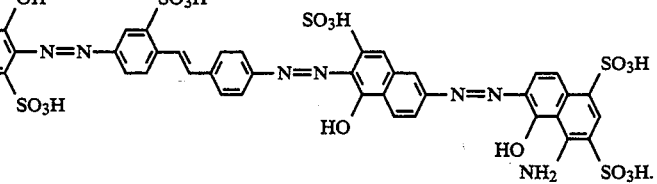

3. A film as claimed in claim 1 containing polyamides, cellulose acetate, vinyl alcohol homopolymers and copolymers or vinyl acetate homopolymers and copolymers as the at least one organic polymer.

4. A film as claimed in claim 1 containing polyvinyl alcohols which have been obtained by complete or partial saponification of polyvinyl acetate as the at least one organic polymer.

5. A film as claimed in claim 4 containing polyvinyl alcohols having a degree of saponification of >80 mol-% and a viscosity of greater than 4 mPas at 20° C.

6. A film as claimed in claim 1 containing dyes of formula I in a quantity of 0.01 to 10% by weight, based on 100% by weight film weight.

7. A film as claimed in claim 1 which is stretched by 200 to 1,000% at a temperature of 60° to 180° C.

* * * * *